(12) United States Patent
Cho et al.

(10) Patent No.: US 12,640,042 B2
(45) Date of Patent: May 26, 2026

(54) APPARATUS FOR CONTROLLING A FLIGHT, SYSTEM HAVING THE SAME AND METHOD THEREOF

(71) Applicants: Hyundai Motor Company, Seoul (KR); Kia Corporation, Seoul (KR)

(72) Inventors: Hyun Ki Cho, Anyang-Si (KR); Jin Soo Jang, Yongin-Si (KR); Yoon Cheol Jeon, Suwon-Si (KR); Jong Pil Kim, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 308 days.

(21) Appl. No.: 18/133,682

(22) Filed: Apr. 12, 2023

(65) Prior Publication Data

US 2024/0177615 A1 May 30, 2024

(30) Foreign Application Priority Data

Nov. 28, 2022 (KR) .......................... 10-2022-0161846

(51) Int. Cl.
*G08G 5/00* (2025.01)
*B64U 10/20* (2023.01)
(Continued)

(52) U.S. Cl.
CPC ............... *G08G 5/30* (2025.01); *B64U 10/20* (2023.01); *B64U 50/32* (2023.01); *G08G 5/26* (2025.01); *B64U 2101/60* (2023.01)

(58) Field of Classification Search
CPC .. G08G 5/30; G08G 5/26; G08G 5/57; G08G 5/55; G08G 5/32; B64U 10/20;
(Continued)

(56) References Cited

U.S. PATENT DOCUMENTS

| | | | |
|---|---|---|---|
| 9,864,368 B2 | 1/2018 | Krupansky et al. | |
| 11,104,444 B2 | 8/2021 | Knapp et al. | |

(Continued)

FOREIGN PATENT DOCUMENTS

| | | |
|---|---|---|
| EP | 3203186 A1 | 8/2017 |
| JP | 2016-184288 A | 10/2016 |

(Continued)

OTHER PUBLICATIONS

Oct. 5, 2024—(EP) Extended European Searh Report—EP Application No. 23211715.0.

(Continued)

*Primary Examiner* — Peter D Nolan
*Assistant Examiner* — Demetra R Smith-Stewart
(74) *Attorney, Agent, or Firm* — Banner & Witcoff, Ltd.

(57) ABSTRACT

The present disclosure relates to a flight control apparatus, a system including the same, and a method thereof. An example embodiment of the present disclosure provides a flight control apparatus, including: at least one processor, and memory storing instructions that, when executed by the at least one processor, cause the flight control apparatus to determine, based on environmental information and based on variations of a parameter for each operation mode of an aerial vehicle, a flight path among at least one candidate path associated with a destination for the aerial vehicle.

19 Claims, 10 Drawing Sheets

(51) Int. Cl.
    *B64U 50/32*       (2023.01)
    *G08G 5/26*       (2025.01)
    *G08G 5/30*       (2025.01)
    *B64U 101/60*     (2023.01)

(58) Field of Classification Search
    CPC .... B64U 50/32; B64U 2101/60; B64C 13/18;
                    B64D 27/24; B64D 31/06; B64D
                            2041/005; Y02T 50/60
    See application file for complete search history.

(56) References Cited

U.S. PATENT DOCUMENTS

| | | | |
|---|---|---|---|
| RE48,962 E | | 3/2022 | Krupansky et al. |
| 11,293,777 B2 | | 4/2022 | Durand et al. |
| 11,573,575 B2 * | | 2/2023 | Paglieroni ............ G05D 1/0238 |
| 2014/0222248 A1 * | | 8/2014 | Levien ..................... G08G 5/57 |
| | | | 701/2 |
| 2017/0203850 A1 * | | 7/2017 | Wang ..................... B64U 30/20 |
| 2017/0227955 A1 | | 8/2017 | Krupansky et al. |
| 2020/0290742 A1 * | | 9/2020 | Kumar ................... B64D 27/35 |
| 2022/0269290 A1 * | | 8/2022 | Dadkhah Tehrani .... G05D 1/81 |
| 2022/0402621 A1 * | | 12/2022 | McLean ................. B60L 58/12 |

FOREIGN PATENT DOCUMENTS

| | | |
|---|---|---|
| JP | 2019-164415 A | 9/2019 |
| JP | 2022-537148 A | 8/2022 |
| KR | 10-1833242 B1 | 3/2018 |

OTHER PUBLICATIONS

The Avionics Handbook, Chapter 15 : Flight Management Systems_ XP-002648022 (25 pages).

* cited by examiner

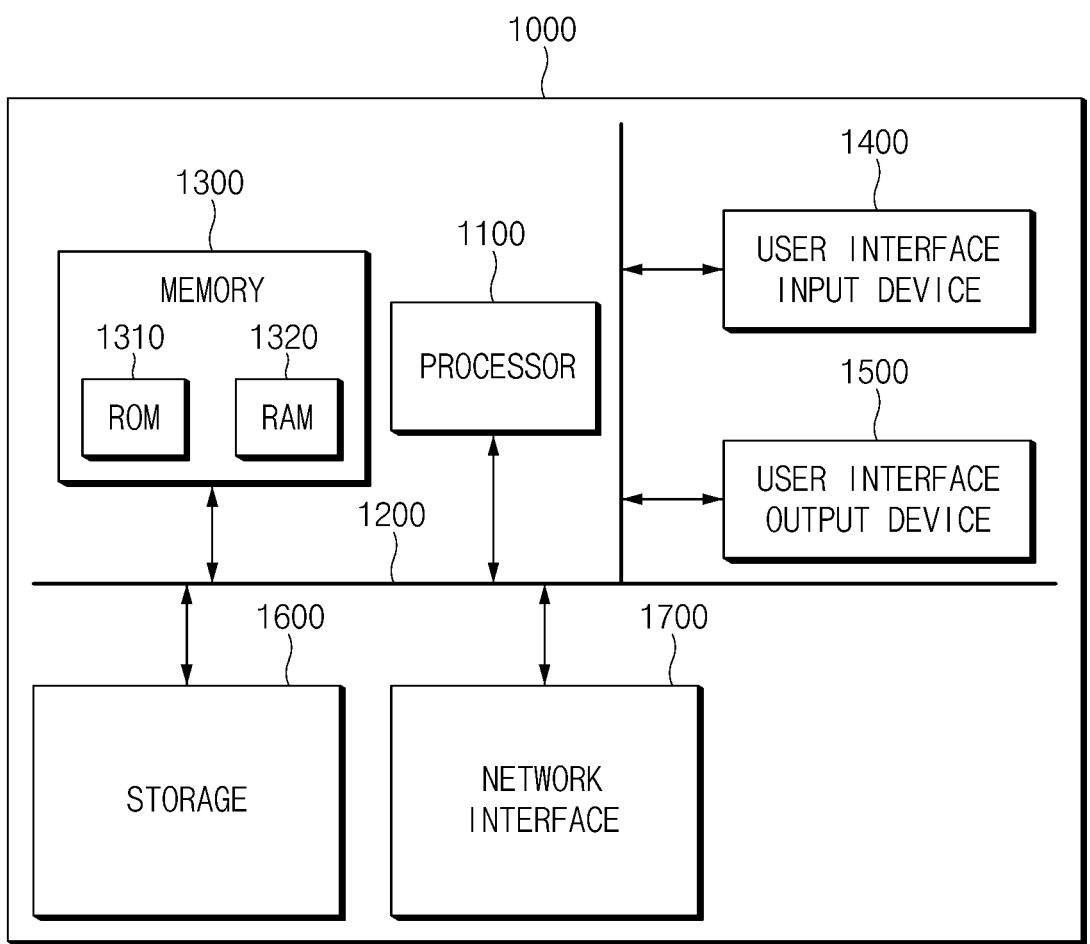
F I G .10

1

APPARATUS FOR CONTROLLING A FLIGHT, SYSTEM HAVING THE SAME AND METHOD THEREOF

CROSS-REFERENCE TO RELATED APPLICATION

This application claims priority to and the benefit of Korean Patent Application No. 10-2022-0161846, filed in the Korean Intellectual Property Office on Nov. 28, 2022, the entire contents of which are incorporated herein by reference.

BACKGROUND

(a) Field

The present disclosure relates to a flight control apparatus, a system including the same, and a method thereof, and more particularly, to a technique for determining an optimal path for flight.

(b) Description of the Related Art

An aerial vehicle may be an aircraft (e.g., an airplane, a flying vehicle, a roadable aircraft, a flying car, an urban air mobility, an unmanned aerial vehicle, a drone, etc.) that has occupants (e.g., pilots, passengers, etc.) onboard and can fly and/or drive autonomously or semi-autonomously. An aerial vehicle may also fly autonomously by external control or program without any occupants onboard (e.g., unmanned). Accordingly, such an autonomous aerial vehicle may be used in various fields such as visiting and investigating areas where it is difficult for humans to fly directly to perform missions, meteorological observation, planetary exploration, aerial photography, etc.

The aerial vehicle creates a path from a place of departure (e.g., origin) to a destination and flies by following the created path. However, user needs for providing paths reflecting various environments for flight and user wants are increasing.

Accordingly, it is necessary to determine an optimal path by reflecting environment information and an operation mode when creating a path.

The above information disclosed in this Background section is only for enhancement of understanding of the background of the disclosure, and therefore, it may contain information that does not form the prior art that is already known in this country to a person of ordinary skill in the art.

SUMMARY

Example embodiments of the present disclosure have been made in an effort to provide a flight control apparatus, a system including the same, and a method thereof, which may determine an optimal flight path of an aerial vehicle based on environmental information and parameter variations for each operation mode.

In addition, other example embodiments of the present disclosure have been made in an effort to provide a flight control apparatus, a system including the same, and a method thereof, which may control output distribution of a hybrid energy source based on output voltages of a battery and a fuel cell system.

The technical objects of the present disclosure are not limited to the objects mentioned above, and other technical objects not mentioned may be clearly understood by those skilled in the art from the description of the claims.

According to one or more example embodiments, a flight control apparatus may include at least one processor, and memory storing instructions that, when executed by the at least one processor, cause the flight control apparatus to determine, based on environmental information and based on variations of a parameter for each operation mode of an aerial vehicle, a flight path among at least one candidate path associated with a destination for the aerial vehicle.

The environmental information may include at least one of: cost information regarding costs incurred during a flight, noise information regarding noises generated during the flight, or obstacle information regarding obstacles encountered during the flight.

The operation mode may include at least one of: a comfort mode for user comfort, an express mode for improving movement speed, or an eco mode for cost reduction.

The instructions, when executed by the at least one processor, may further cause the flight control apparatus to, based on the operation mode being set as the comfort mode, increase, relative to the express mode, the parameter comprising at least one of a ground-roll distance, a cruise altitude, a loiter duration, or a loiter altitude.

The instructions, when executed by the at least one processor, may further cause the flight control apparatus to, based on the operation mode being set as the comfort mode, reduce, relative to the express mode, the parameter comprising at least one of an initial climb angle, an enroute climb angle, a cruise speed, or a descend angle.

The parameter may include at least one of: a ground-roll distance, an initial climb angle, an enroute climb angle, a climb speed, a cruise altitude, a cruise speed, a descend angle, a loiter duration, or a loiter altitude.

The flight control apparatus may further include an interface device configured to receive an origin of the aerial vehicle and the destination.

The instructions, when executed by the at least one processor, may further cause the flight control apparatus to determine, based on a user input, an origin of the aerial vehicle and the destination, and, based on the origin and the destination, generate the at least one candidate path.

The instructions, when executed by the at least one processor, may further cause the flight control apparatus to determine whether an obstacle is safe in an ascending path of the determined flight path.

The instructions, when executed by the at least one processor, may further cause the flight control apparatus to determine whether the obstacle is safe by determining whether a distance from a one-engine operated path to the obstacle on ground is greater than or equal to a predetermined reference value.

The instructions, when executed by the at least one processor, may further cause the flight control apparatus to, after determining that the obstacle is safe, determine whether it is possible for the aerial vehicle to fly to the destination based on: an amount of charge in a battery of the aerial vehicle, and a remaining capacity of a fuel cell system of the aerial vehicle.

The instructions, when executed by the at least one processor, may further cause the flight control apparatus to calculate, based on a determination that it is possible for the aerial vehicle to fly to the destination, an estimated time of arrival and a fare.

The instructions, when executed by the at least one processor, may further cause the flight control apparatus to cause the aerial vehicle to use an output voltage of a fuel cell system, of the aerial vehicle, during flight of the aerial vehicle, and, based on a requested power output being greater than a maximum power output of the fuel cell system, cause the aerial vehicle to use an output voltage of a battery.

The instructions, when executed by the at least one processor, may further cause the flight control apparatus to, based on at least one of ground-roll, climb, or loiter of the aerial vehicle being selected, cause the aerial vehicle to use an output voltage of a fuel cell system and an output voltage of a battery.

The instructions, when executed by the at least one processor, may further cause the flight control apparatus to, based on the aerial vehicle descending or performing a ground roll for landing, cause the aerial vehicle to use an output voltage of a fuel cell system of the aerial vehicle.

According to one or more example embodiments, a system may include a battery configured to supply power to an aerial vehicle, a fuel cell system configured to supply power to the aerial vehicle, and a flight control apparatus. The flight control apparatus may be configured to determine, based on environmental information and based on variations of a parameter for each operation mode of the aerial vehicle, a flight path among at least one candidate path associated with a destination for the aerial vehicle, and distribute, to the aerial vehicle, output voltages of the battery and the fuel cell system.

According to one or more example embodiments, a flight control method may include generating, by a processor, at least one candidate path associated with a destination for an aerial vehicle, and determining, based on environmental information and based on variations of a parameter for each operation mode, a flight path among the at least one candidate path.

The environmental information may include at least one of: cost information regarding costs incurred during a flight, noise information regarding noises generated during the flight, or obstacle information regarding obstacles encountered during the flight.

The operation mode may include at least one of: a comfort mode for user comfort, an express mode for improving movement speed, or an eco mode for cost reduction.

The parameter may include at least one of: a ground-roll distance, an initial climb angle, an enroute climb angle, a climb speed, a cruise altitude, a cruise speed, a descend angle, a loiter duration, or a loiter altitude.

According to the present technique(s), it may be possible to determine an optimal flight path of a flight means based on environmental information and parameter variations for each operation mode.

According to the present technique(s), it may be possible to control output distribution of a hybrid energy source based on output voltages of a battery and a fuel cell system.

Furthermore, various effects that can be directly or indirectly identified through this document may be provided.

BRIEF DESCRIPTION OF THE DRAWINGS

FIG. 10 illustrates an example computing system.

DETAILED DESCRIPTION

Figure 1:
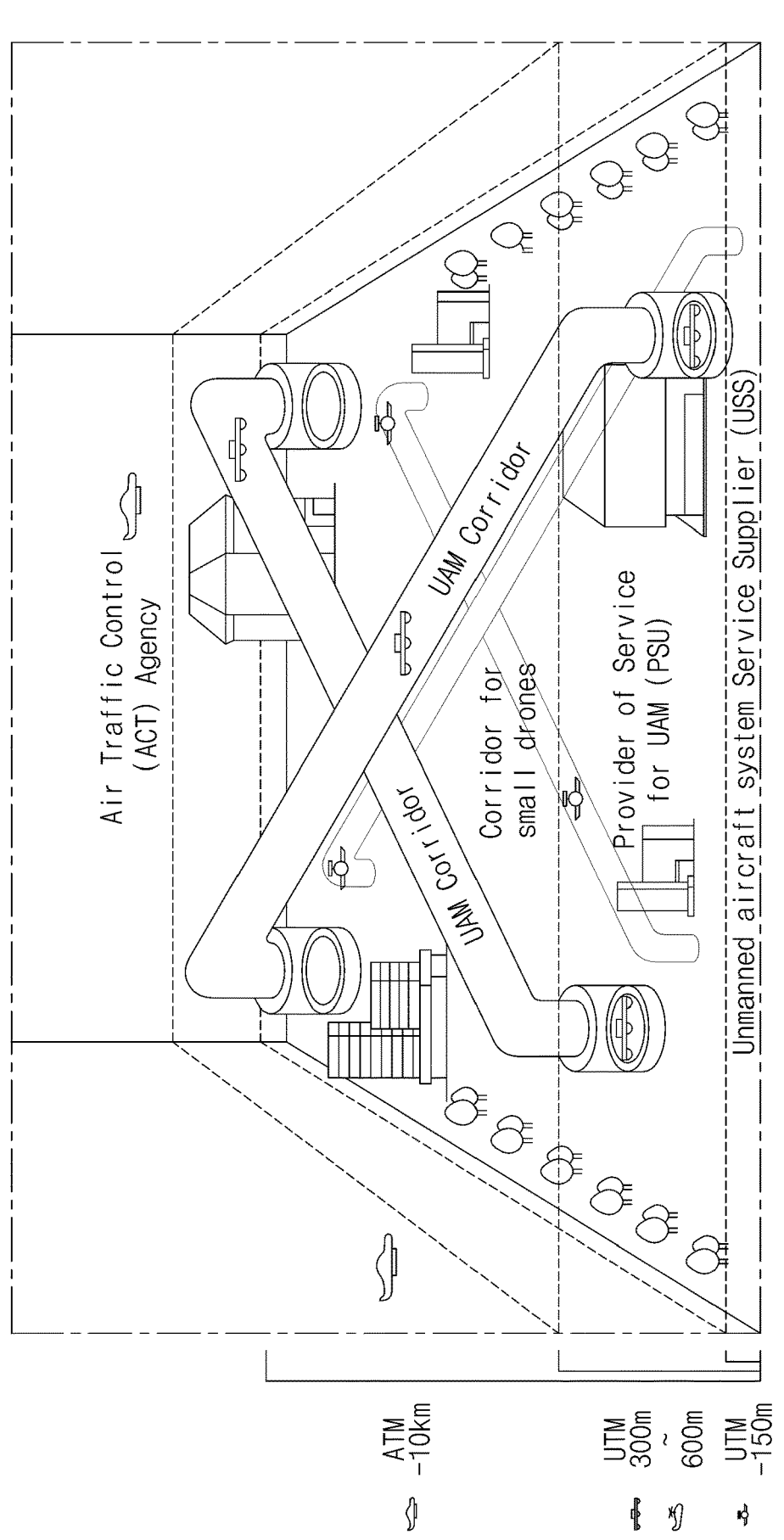
FIG. 1 illustrates a schematic view showing an example operation of urban air mobility (UAM).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an example embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various example embodiments of the present disclosure will be described in detail with reference to FIG. 1 to FIG. 10.

FIG. 1 illustrates a schematic view showing an example operation of an aerial vehicle such as an urban air mobility (UAM).

The urban air mobility refers to an urban transportation system that uses aircraft to transport people and cargo. As illustrated in FIG. 1, the urban air mobility (hereinafter referred to as UAM) includes not only aircraft but also air traffic control, take-off and landing facilities, and transportation service platforms. In addition, the UAM may include personal air vehicles (PAVs) capable of vertical take-off and landing (VTOL), air taxis, or public transportation services.

Advanced air mobility (AAM) is being developed for an operation of such urban air mobility, and is a means of transportation that includes air movement between complex city centers and regional hubs. The present disclosure discloses a technology for controlling the optimal path of an aerial vehicle as advanced air mobility.

Figure 2:
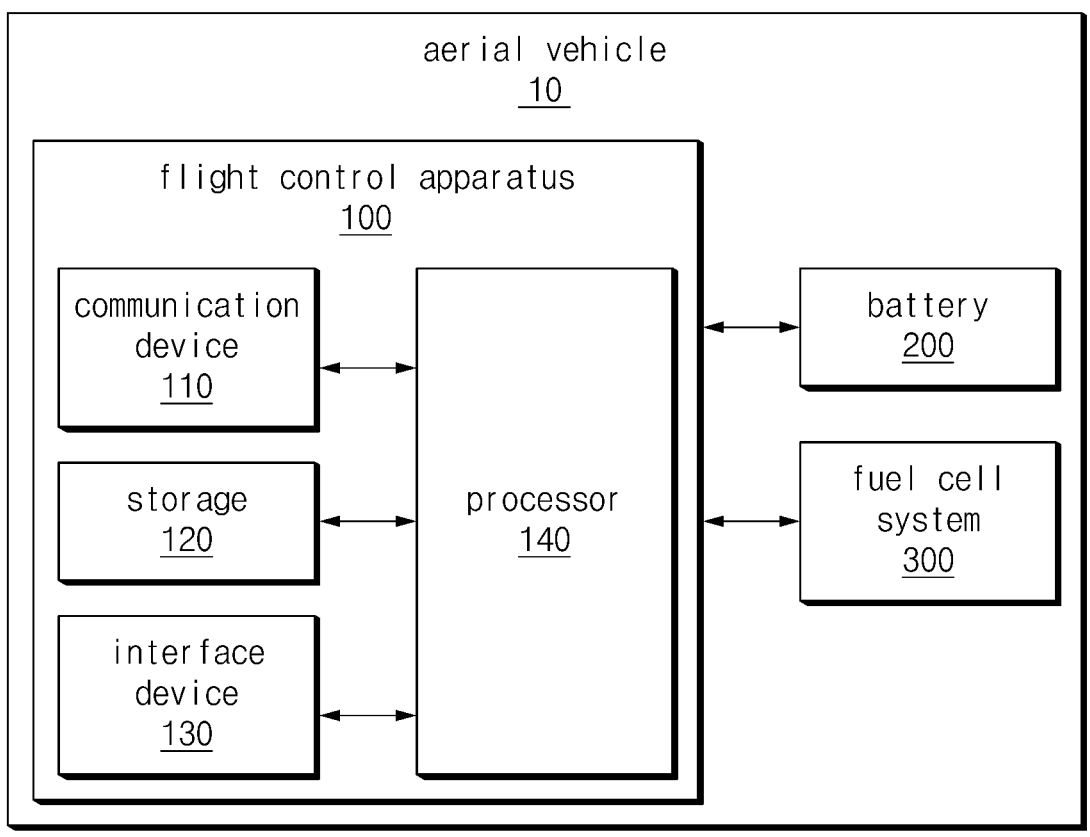
FIG. 2 illustrates a block diagram showing a configuration of an example aerial vehicle including a flight control apparatus.

FIG. 2 illustrates a block diagram showing a configuration of an example aerial vehicle including a flight control apparatus.

The aerial vehicle 10 according to one or more example embodiments of the present disclosure may include a flight control apparatus 100, a battery 200, and a fuel cell system 300. Accordingly, the aerial vehicle 10 may be driven as a hybrid system using the battery 200 and the fuel cell system 300.

The aerial vehicle 10 may include a first kind of air mobility vehicle that has occupants, including pilots and passengers, onboard and may fly autonomously or semi-autonomously, and a second kind of air mobility vehicle that may fly autonomously by external control or program without occupants onboard. Specifically, the aerial vehicle 10 may include a helicopter, a drone, an airplane, or a vehicle that moves with wheels on the ground and can fly when it goes up in the air, and as mentioned earlier, these may include both manned and unmanned cases.

The flight control apparatus 100 according to the present disclosure may be implemented inside or outside the aerial vehicle. In this case, the flight control apparatus 100 may be integrally formed with internal control units of the aerial vehicle, or may be implemented as a separate hardware device to be connected to control units of the aerial vehicle by a connection means. For example, the flight control apparatus 100 may be implemented integrally with the aerial vehicle, may be implemented in a form that is installed or attached to the aerial vehicle as a configuration separate from the aerial vehicle, or a part thereof may be implemented integrally with the vehicle, and another part may be implemented in a form that is installed or attached to the aerial vehicle as a configuration separate from the aerial vehicle.

The flight control apparatus 100 may determine an optimal flight path based on environmental information and parameter variations for each operation mode among at least one candidate path to a destination, and may distribute an output of a hybrid energy source based on remaining energy, etc. of the battery 200 and the fuel cell system 300.

In this case, the operation mode of the aerial vehicle 10 may include a comfort mode, an express mode, and an eco mode.

The comfort mode is an operation mode that focuses on enabling a user to use a aerial vehicle more comfortably. The express mode is an operation mode that focuses on being able to use the aerial vehicle efficiently and quickly rather than the user's comfort. The eco mode is an operation mode that focuses on minimizing a cost consumed in flight.

The flight control apparatus 100 may set different control ranges of parameters for each mode so that a purpose of each operation mode described above is achieved. The control ranges of parameters for each operation mode will be described later with reference to Table 2.

Referring to FIG. 2, the flight control apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition, the communication device 110 may perform communication with an external server, infrastructure, other aerial vehicles, etc. through a wireless communication technique. Herein, the wireless communication techniques may include very high frequency (VHF) communication, high frequency (HF) communication, satellite communication system (SATCOM), etc.

The communication device 110 may communicate with an air traffic controller (ATC) using microwave wireless communication. In addition, the communication device 110 may perform a long-distance call using shortwave wireless communication between a an aerial vehicle and the ground or between an aerial vehicle and another aerial vehicle.

As an example, the communication device 110 may transmit a control signal outputted by the processor 140 to the storage 120 and the interface device 130, and may receive a signal from the storage 120 and the interface device 130.

The storage 120 may store data and/or algorithms required for the processor 140 to operate, and the like. For example, the storage 120 may store instructions that may, when executed by one or more processors, cause the flight control apparatus 110 to perform various operations described herein.

As an example, the storage 120 may store a parameter control range table for each operation mode, an environment rate table, and the like. The parameter control range table for each operation mode and the environment rate table will be described in detail later through Table 1 and Table 2.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the flight control apparatus 100 and results thereof. Herein, the input means may include a key button, and may include a mouse, a joystick, a jog shuttle, a stylus pen, and the like. Furthermore, the input means may include a soft key implemented on the display.

For example, the input means may receive a departure point, a destination, or an operation mode (e.g., eco mode, comfort mode, express mode, etc.) from a user.

The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage 120, the interface device 130, and the like, may electrically control each component, and may be an electrical circuit that executes software commands, thereby performing various data processing and calculations described below.

The processor 140 may process a signal transferred between components of the flight control apparatus 100 to perform overall control such that each of the components can perform its function normally. The processor 140 may be implemented in the form of hardware, software, or a combination of hardware and software. For example, the processor 140 may be implemented as a microprocessor, but the present disclosure is not limited thereto.

The processor 140 may determine an optimal flight path based on environmental information and parameter variations for each operation mode among at least one candidate path to a destination. In this case, the environmental information may include at least one of an eco rating that is cost information consumed during flight, a silence rating that is noise information generated during flight, an obstacle rating that is obstacle information during flight, or a combination thereof.

In addition, the operation mode may include at least one of a comfort mode for user comfort, an express mode for improving movement speed, an eco mode for cost reduction, or a combination thereof.

In addition, parameters for each operation mode may include at least one of a ground-roll distance, an initial climb angle, an enroute climb angle, a climb speed, a cruise altitude, a cruise speed, a descend angle, a loiter duration, a loiter altitude, or a combination thereof.

The processor 140 may increase at least one of the ground-roll distance, the cruise altitude, the loiter duration, the loiter altitude, or a combination thereof among the parameters for each operational mode when the operation mode is the comfort mode compared with the express mode.

The processor 140 may reduce at least one of the initial climb angle, the enroute climb angle, the cruise speed, the descend angle, or a combination thereof among the parameters for each operational mode when the operation mode is the comfort mode compared with the express mode.

The processor 140 may generate at least one candidate based on an origin and a destination inputted by a user, and may determine an optimal flight path based on environmental information and parameter variations for each operation mode among at least one candidate flight path.

The processor 140 may determine whether an obstacle is safe in an ascending path of the determined flight path.

The processor 140 may determine whether an obstacle is safe by determining whether a distance from a one engine operated (or one engine inoperative, OEI) path to the obstacle on the ground is equal to or greater than a predetermined reference value.

If the obstacle is determined to be safe, the processor 140 may determine whether it is possible to fly to a destination based on an amount of charge in a battery and a remaining capacity of a fuel cell system.

When it is determined that the flight is possible, the processor 140 may calculate an estimated time of arrival and a fare.

The processor 140 may use an output voltage of the fuel cell system during flight of an aerial vehicle, and may use an output voltage of the battery when a requested output (e.g., a requested power output) is greater than a maximum output (e.g., a maximum power output) of the fuel cell system.

The processor 140 may use both the output voltage of the fuel cell system and the output voltage of the battery when at least one of ground-roll, climb, and loiter of the aerial vehicle, or a combination thereof is selected.

The processor 140 may use the output voltage of the fuel cell system when the aerial vehicle descends or when ground rolls for landing.

Figure 3:
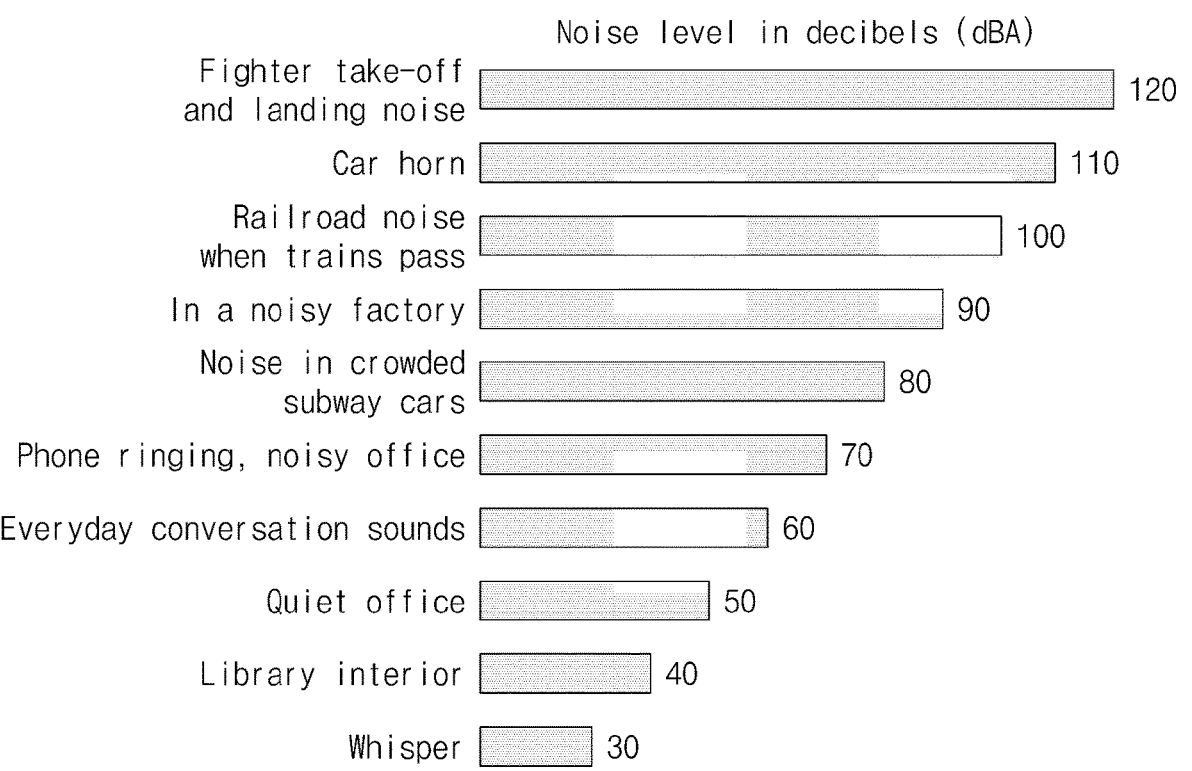
FIG. 3 illustrates a view for describing an example silence rating among environmental noises.
Figure 4:
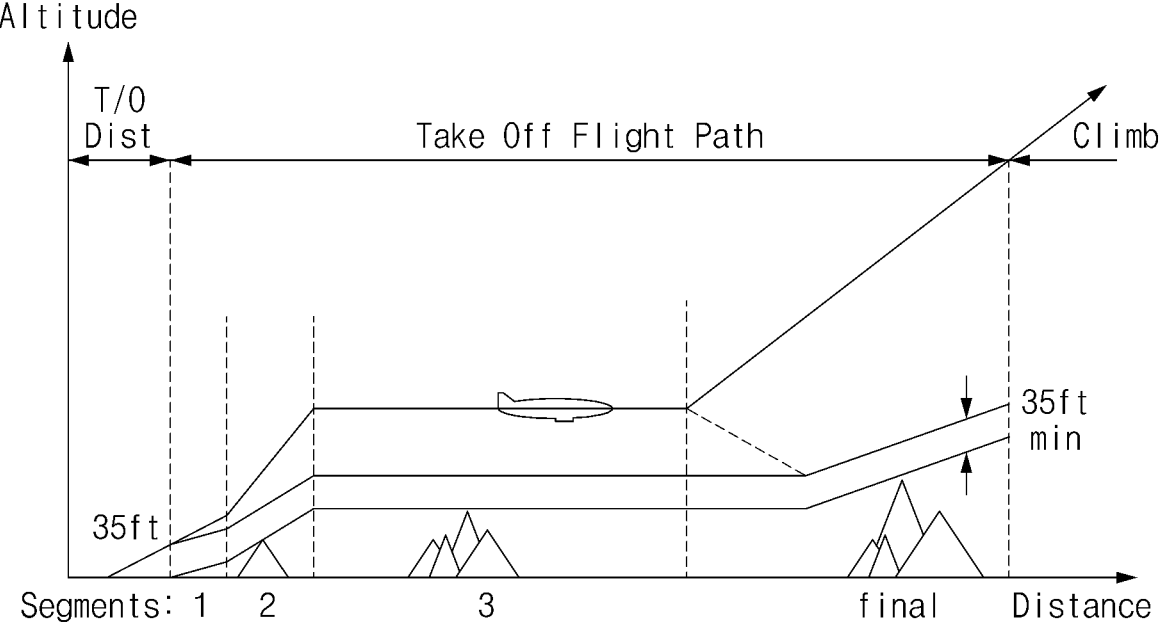
FIG. 4 illustrates a view for describing an example obstacle rate among environment rates.

FIG. 3 illustrates a view for describing an example silence rating among environmental noises, and FIG. 4 illustrates a view for describing an example obstacle rating among environment ratings.

FIG. 3 illustrates noise levels in decibels, and it may be seen that a take-off and landing noise of a fighter jet is the greatest. Accordingly, it may be desirable to determine a path capable of minimizing noise caused by take-off and landing of the aerial vehicle.

Referring to FIG. 4, a flight altitude and a distance to an obstacle are illustrated. That is, an optimal path may be determined for each flight path based on whether an obstacle exists or not, whether the obstacle is high or not, and the like. In other words, a path in which more low obstacles than high obstacles exist may be determined as an optimal path.

Table 1 is an environmental rating table.

TABLE 1

| Environment rating | Eco rating | Silence rating | Obstacle rating |
|---|---|---|---|
| 5 | "Cost" == Very Low | Noise(dBA) < 60 | Obstacle(ft.) < 400 |
| 4 | "Cost" == Low | 60 ≤ Noise(dBA) < 70 | 400 ≤ Obstacle(ft.) < 800 |
| 3 | "Cost" == Affordable | 70 ≤ Noise(dBA) < 80 | 800 ≤ Obstacle(ft.) < 1,200 |
| 2 | "Cost" == High | 80 ≤ Noise(dBA) < 90 | 1,200 ≤ Obstacle(ft.) < 1,600 |
| 1 | "Cost" == Very High | 90 ≤ Noise(dBA) | 1,600 ≤ Obstacle(ft.) |

Referring to Table 1, the environment rating may be classified into 5 levels, and applied values of an eco rage, a silence rating, and an obstacle rating for each level may be applied. The eco rating may indicate the amount of cost consumed when flying a corresponding path, the silence rating may indicate a level of noise during flight of the corresponding path, and the obstacle rating may indicate how far a height of an obstacle in the corresponding path is from the path.

It may be seen that Level 1 of the environment rating is the lowest and Level 5 is the highest, and a state of the environment rating increases to an optimal state as the level increases from Level 1.

Accordingly, the flight control apparatus 100 may select a flight path close to an optimal level (e.g., Level 5) by applying a step-by-step condition of the environmental rating among a plurality of flight paths.

Figure 5:
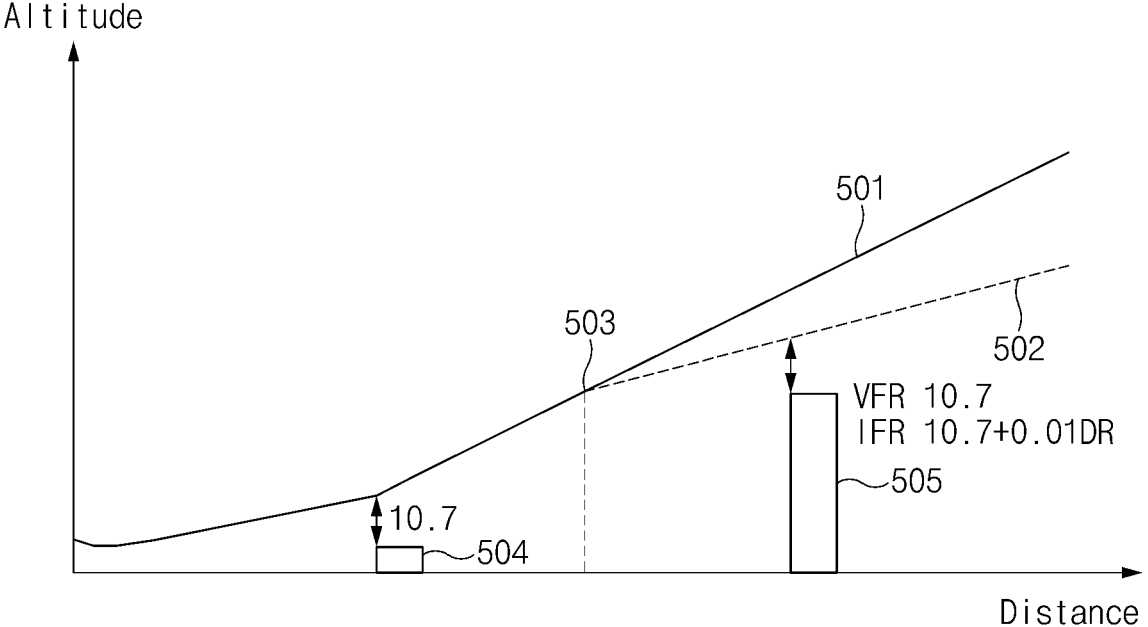
FIG. 5 illustrates an example view for describing an obstacle safety determination method.

FIG. 5 illustrates an example view for describing an obstacle safety determination method.

Referring to FIG. 5, when an aerial vehicle takes off, a reference numeral 501 denotes an altitude during normal take-off. A reference numeral 502 may indicate an one engine inoperative (OEI) altitude, which is a climb altitude can be maintained with remaining engines when one engine fails, a climb altitude can be maintained by using only an output of a fuel cell when a battery fails in a hybrid system, a climb altitude can be maintained by using only an output of the battery when the fuel cell fails in a hybrid system, or a climb altitude can be maintained when a single failure of the motor and inverter occurs. When the aerial vehicle takes off, the normal take-off altitude 501 and the OEI altitude 502 may be distinguished at a point 503 defined after take-off.

In this case, obstacles 504 and 505 may exist on the ground in a path when the aerial vehicle takes off. The flight control apparatus 100 may determine obstacle safety by determining whether a distance between the OEI altitude and an obstacle 505 (e.g., a city structure such as a mountain or a building) is equal to or greater than a predetermined reference value. That is, the flight control apparatus 100 may determine that the distance between the OEI altitude 502 and the obstacle 505 is safe when the distance is greater than the predetermined reference value.

Control ranges of parameters for each operation mode will be described below with reference to Table 2, FIG. 6 and FIG. 7.

Table 2 below is a table showing control ranges of parameters for each operation mode.

TABLE 2

| Parameters | Eco mode | Comfort mode | Express mode |
|---|---|---|---|
| Ground-roll distance | 0%-A2% | 0%-A2% | A1%-0% |
| Initial climb angle (main) | B1%-B2% | B1%-0% | 0-B2% |
| Enroute climb angle (main) | B1%-B2% | B1%-0% | 0-B2% |
| Climb speed (main) | C1%-C2% | C1%-0% | 0-C2% |
| Cruise altitude | D1%-D2% | 0-D2% | D1%-0% |
| Cruise speed | C1%-0% | C1%-0% | 0-C2% |
| Descend angle | B1%-B2% | B1%-0% | 0-B2% |
| Initial climb angle (reserve) | B1%-B2% | B1%-0% | 0-B2% |
| Enroute climb angle (reserve) | B1%-B2% | B1%-0% | 0-B2% |
| Climb speed (reserve) | C1%-C2% | C1%-0% | 0-C2% |
| Loiter duration | C1%-0% | 0-C2% | C1%-0% |
| Loiter altitude | D1%-0% | 0-D2% | D1%-0% |

As shown in Table 2, parameters for path determination may include parameters applied in a main mission and parameters applied in a reserve mission. The main mission indicates a case of normal flight, and the reserve mission indicates that the aerial vehicle is not landing, and is waiting in the sky near the airport, which is designated by law.

The parameters of the main mission may include at least one of a ground-roll distance, an initial climb angle, an enroute climb angle, a climb speed, a cruise altitude, a cruise speed, a descend angle, a loiter duration, a loiter altitude, or a combination thereof.

The parameters of the reserve mission may include an initial climb angle, an enroute climb angle, a climb speed, a loiter duration, and a loiter altitude.

For example, the ground-roll distance is increased in a range of 0% to A % in the eco and the comfort modes, and decreased in a range of –A % to 0% in the express mode.

In addition, the initial climb may be adjusted in a range of –B % to B % in the eco mode, may be decreased in a range of –B % to 0% in the comfort mode, and may be increased in a range of 0% to B % in the express mode. In addition, the other parameters may be varied for each mode, and the climb angle, the climb speed, and the cruise speed may be increased in the express mode and may be decreased in the comfort mode. In Table 2, A, B, C, D, etc. may be determined in advance by experimental values.

As shown in Table 2, the flight control apparatus 100 may stores in the storage 120 a table in which control ranges of parameters for each operation mode (e.g., the eco mode, the comfort mode, and the express mode) are pre-matched, and when the operation mode is determined by a user, may determine an optimal flight path by applying the parameters of the corresponding operation mode to the flight path.

Figure 6:
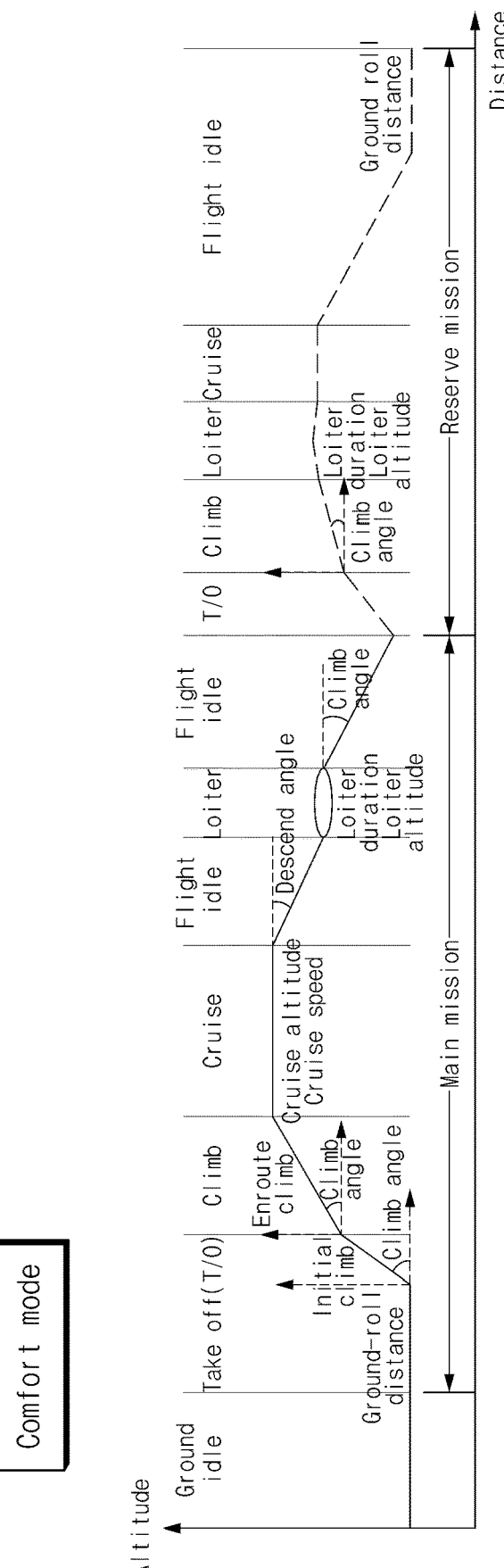
FIG. 6 illustrates a view for describing an example of applying parameters in a comfort mode.
Figure 7:
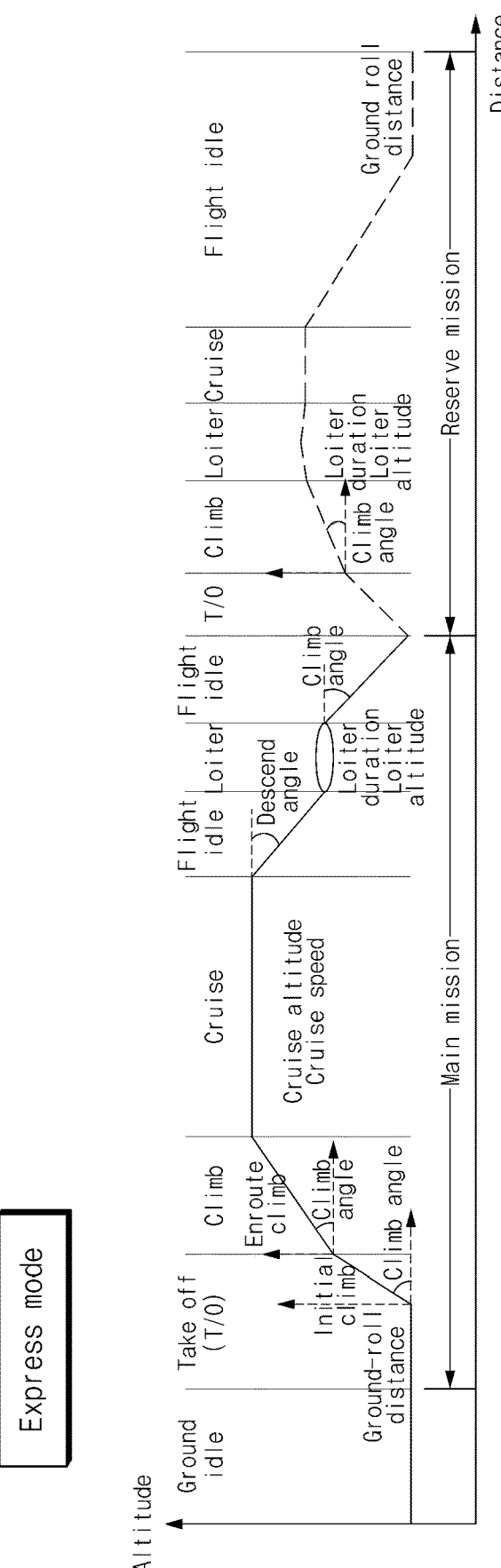
FIG. 7 illustrates a view for describing an example of applying parameters in an express mode.

FIG. 6 illustrates a view for describing an example of applying parameters in a comfort mode, and FIG. 7 illustrates a view for describing an example of applying parameters in an express mode.

Referring to FIG. 6 and FIG. 7 together, control ranges of parameters in the comfort mode and parameters in the express mode may be compared.

A ground-roll distance, a cruise altitude, a loiter duration, and a loiter altitude of a main mission, and a climb angle, a loiter duration, and a loiter altitude of a reserve mission in the comfort mode may be increased compared to the express mode.

In addition, it may be seen that a climb angle, a cruise speed, a descend angle, etc. of the main mission in the comfort mode may be reduced compared to those in the express mode.

As such, it may be possible to enable an aerial vehicle to fly based on purposes of the comfort mode and the express mode through an increase or decrease of the parameters.

For example, in the comfort mode, user comfort may be increased by increasing the ground-roll distance by 20% and decreasing the climb angle compared to the express mode.

Figure 8:
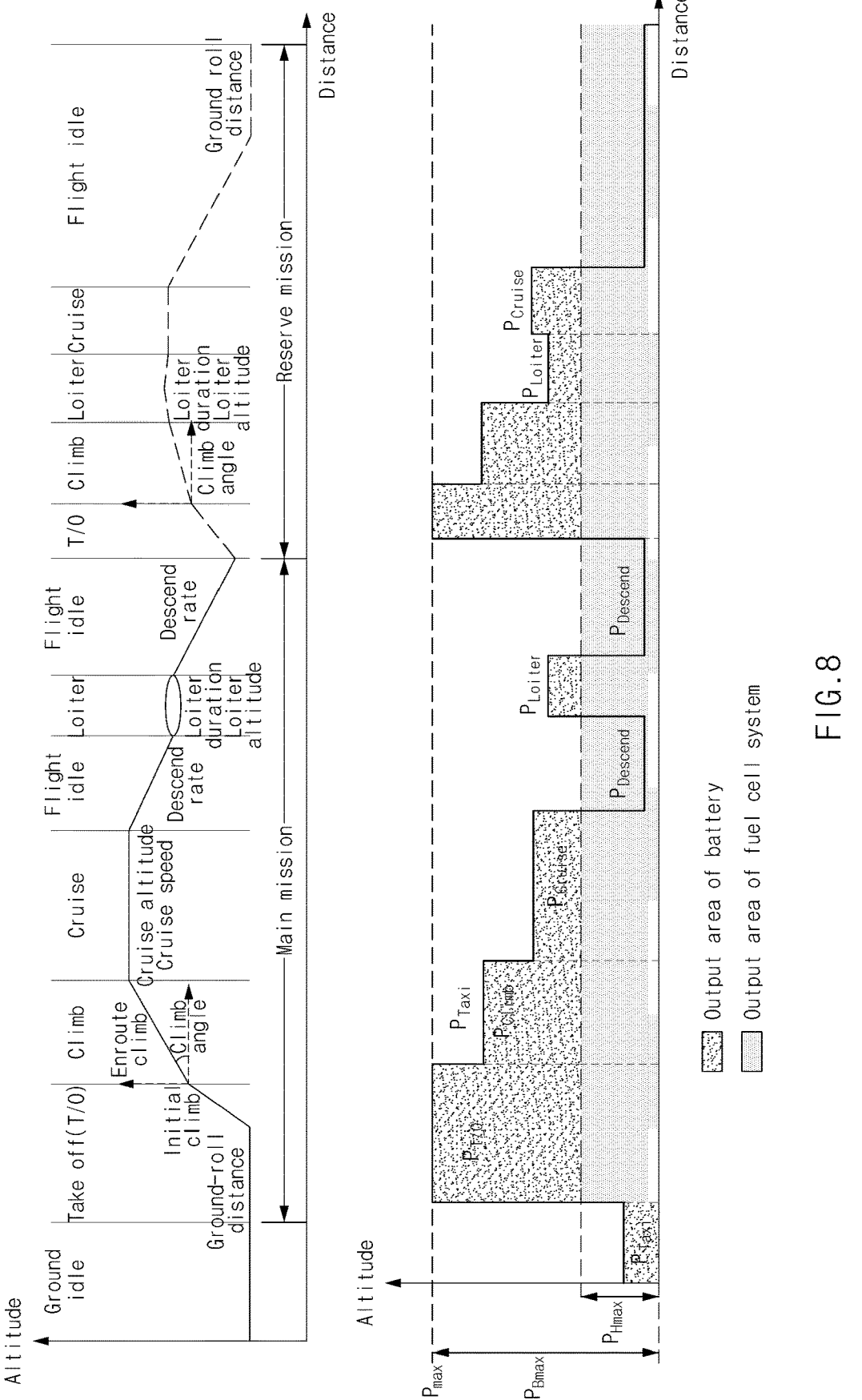
FIG. 8 illustrates examples of a battery output area and a fuel cell system output area.

FIG. 8 illustrates examples of a battery output area and a fuel cell system output area.

Referring to FIG. 8, an output area of a battery and an output area of a fuel cell system are illustrated. That is, a maximum output $P_{Hmax}$ of the fuel cell system 300, a maximum output $P_{Bmax}$ of the battery 200, and a maximum value $P_{max}$ of the required output may be displayed.

The maximum output of the fuel cell system 300 has a constant value. Accordingly, a base load requiring a constant output may be driven by an output of the fuel cell system 300.

However, the output voltage of the battery 200 may be used for a required output exceeding the maximum output $P_{Hmax}$ of the fuel cell system 300.

That is, when the aerial vehicle 10 is driven for take-off, the flight control apparatus 100 uses the output voltage of the battery 200 and the output voltage of the fuel cell system 300 together until it ascends and reaches the cruise altitude. Thereafter, that is, when the aerial vehicle 10 descends, it is driven by using only the output voltage of the fuel cell system 300, and during a loitering period, the output voltages of the fuel cell system 300 and the battery 200 may be used together.

Thereafter, the output voltages of the fuel cell system 300 and the battery 200 may be used together while the flight vehicle 10 loiters during the reserve mission, and when the aircraft 10 descends and lands, only the output voltage of the fuel cell system may be used.

As such, according to the present disclosure, the aerial vehicle 10 may be driven by using the output voltage of the fuel cell system 300, and when the output voltage of the fuel cell system 300 is insufficient, may be driven by additionally using the output voltage of the battery 200.

In addition, for advanced air mobility (AAM), as it flies a determined flight path, it may be easy to predict the flight path, so that since it is easy to predict an output and energy consumed, the operation mode of the aerial vehicle 10 may be determined based on user taste and situation, and accordingly, it may be possible to anticipate and control power distribution of a hybrid energy source (battery or fuel cell system) by determining an optimal path in consideration of power output before starting and remaining energy.

Figure 9:
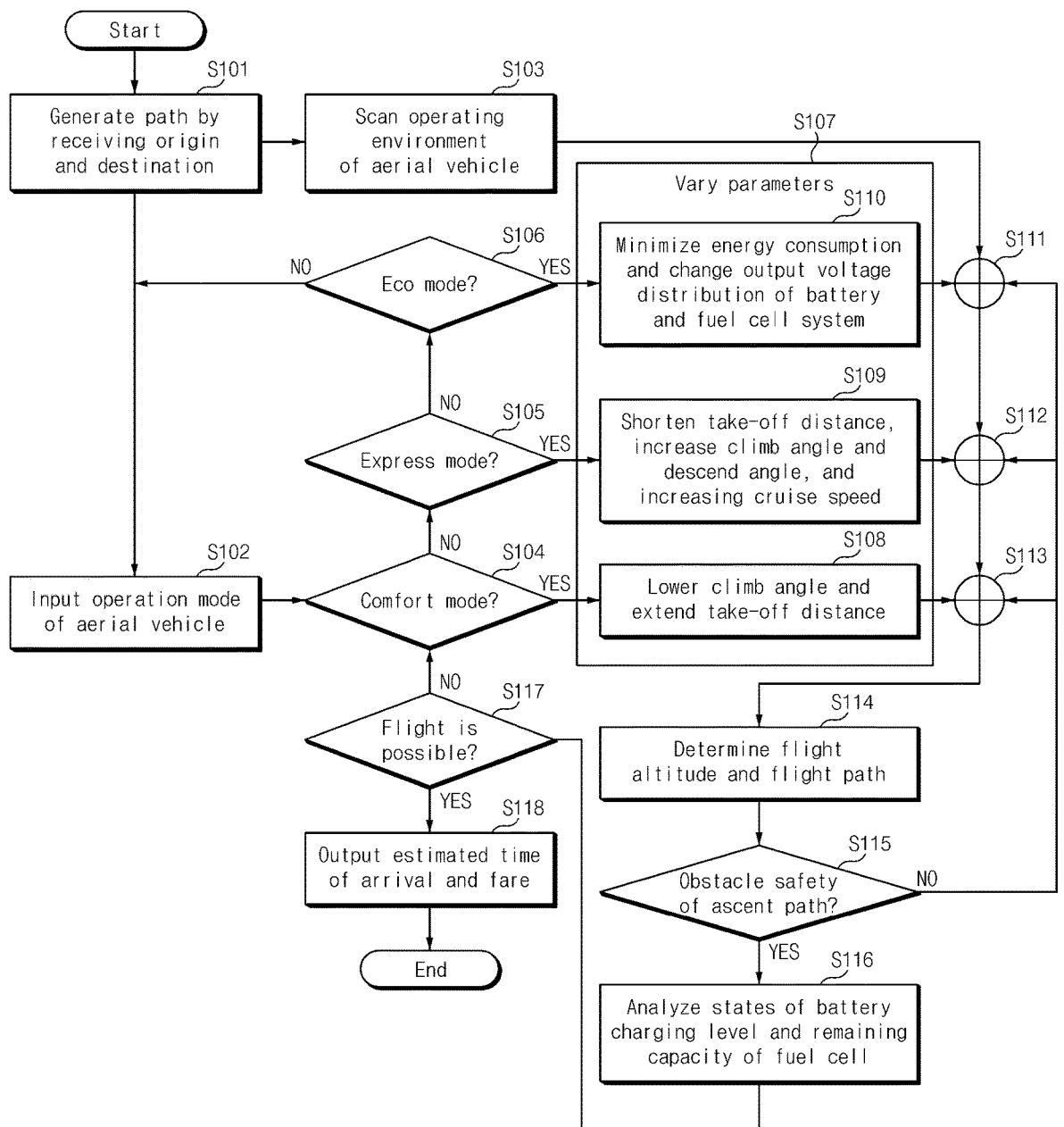
FIG. 9 illustrates a flowchart for describing an example flight control method.

Hereinafter, a flight control method according to one or more example embodiments of the present disclosure will be described in detail with reference to FIG. 9. FIG. 9 illustrates a flowchart for describing an example flight control method.

Hereinafter, it is assumed that the flight control apparatus 100 of the of FIG. 2 performs processes of FIG. 9. In addition, in the description of FIG. 9, operations described as being performed by a device may be understood as being controlled by the processor 140 of the flight control apparatus 100.

Referring to FIG. 9, the flight control apparatus 100 may receive a departure point and a destination from a user for flight (S101).

The flight control apparatus 100 may receive an operation mode of an aerial vehicle from the user (S102). In addition, the flight control apparatus 100 may scan an operating environment of the aerial vehicle (S103).

In this case, the steps S102 and S103 may be performed in parallel.

The flight control apparatus 100 may determine a type of operation mode inputted in step S102 (S104, S105, and S106), and may perform parameter variations based on the inputted operation mode (S107).

More specifically, the flight control apparatus 100 may determine whether the operation mode inputted in step S102 is a comfort mode (S104).

When the operation mode inputted in step S102 is the comfort mode, the flight control apparatus 100 may change parameters such as lowering a climb angle and extending a take-off distance (ground-roll distance) in order to drive the aerial vehicle in the comfort mode (S108).

Meanwhile, when the input operation mode is not the comfort mode, the flight control apparatus 100 may determine whether the operation mode is an express mode (S105).

When the operation mode inputted to the flight control apparatus 100 is the express mode, parameters such as shortening the take-off distance, increasing a climb angle and a descend angle, and increasing a cruise speed may be performed to drive the aerial vehicle in the express mode (S109).

Meanwhile, when the input operation mode is not the express mode, the flight control apparatus 100 may determine whether the operation mode is an eco mode (S106).

When the operation mode inputted to the flight control apparatus 100 is the eco mode, parameter variations such as minimizing energy consumption and changing output voltage distribution of the battery 200 and the fuel cell system 300 may be performed to drive the aircraft in the eco mode.

Meanwhile, when the inputted operation mode is not the eco mode, the flight control apparatus 100 may return to step S102 to receive the operation mode.

Subsequently, the flight control apparatus 100 may reflect the environment rating in step S103 and the variable parameters for each operation mode in step S107 (S111, S112, and S113) to determine an optimal flight altitude and flight path (S114).

For example, the flight control device 100, when 10 candidate paths from an origin to a destination are generated, the flight control apparatus 100 may reflect the environment rating and extract 5 paths with good environment rating among them, and may determine one optimal path by reflecting parameters for each operation mode among the five paths extracted based on the environment rating.

The flight control apparatus 100 may determine obstacle safety of an ascent path among the determined flight paths (S115). The flight control apparatus 100 may determine obstacle safety of the ascent path based on a distance between the OEI altitude and an obstacle of the ascent path, as illustrated in FIG. 5.

When it is determined that the ascent path is not safe from the obstacle, the flight control apparatus 100 may re-determine the flight path through the above steps S111, S112 and S113.

When it is determined that the ascent path is safe from the obstacle, the flight control apparatus 100 may analyze states of a battery charging level and a remaining capacity of a fuel cell (S116), and may determine whether flight is possible by comparing energy required to reach the destination with a current remaining battery charging level and a fuel cell remaining capacity (S117).

That is, when the energy required to reach the destination is equal to or greater than the current remaining battery charging level and the fuel cell remaining capacity, the flight control apparatus 100 may determine that it is impossible to fly to the destination and return to step S104 to change the parameters for each operation mode again.

On the other hand, when the energy required to reach the destination is smaller than the current remaining battery charging level and the fuel cell remaining capacity, the flight control apparatus 100 may determine that it is possible to fly to the destination, may calculate an estimated time of arrival and fare, and may output a result through the interface device 113 (S118).

As such, according to the present disclosure, it may be possible to perform optimal flight control of the aerial vehicle based on user taste and surrounding conditions by determining the optimal path by reflecting the variable parameters and the operating environment rating for each operation mode and by determining a final flight based on safety of the optimal path and remaining energy.

FIG. 10 illustrates an example computing system.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the example embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a compact disc read-only memory (CD-ROM).

An example storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the example embodiments disclosed in the present disclosure are not intended to limit the technical ideas of the present disclosure, but to explain them, and the scope of the technical ideas of the present disclosure is not limited by these example embodiments. The protection range of the present disclosure should be interpreted by the claims below, and all technical ideas within the equivalent range should be interpreted as being included in the scope of the present disclosure.

What is claimed is:

1. A flight control apparatus comprising:

at least one processor; and memory storing instructions that, when executed by the at least one processor, cause the flight control apparatus to:

determine, based on environmental information and based on variations of a parameter for each operation mode of an aerial vehicle, a flight path among at least one candidate path associated with a destination for the aerial vehicle;

determine whether an obstacle is safe in an ascending path of the determined flight path;

change, based on the determination of whether the obstacle is safe in the ascending path, the parameter for each operation mode of the aerial vehicle;

control, based on the determination of whether the obstacle is safe in the ascending path, an output voltage of at least one power source of the aerial vehicle; and control, based on the controlled output voltage, a flight operation of the aerial vehicle.

2. The flight control apparatus of claim 1, wherein the environmental information comprises at least one of:

cost information regarding costs incurred during a flight, noise information regarding noises generated during the flight, or obstacle information regarding obstacles encountered during the flight.

3. The flight control apparatus of claim 1, wherein the operation mode comprises at least one of:

a comfort mode for user comfort, an express mode for improving movement speed, or an eco mode for cost reduction.

4. The flight control apparatus of claim 3, wherein the instructions, when executed by the at least one processor, further cause the flight control apparatus to:

based on the operation mode being set as the comfort mode, increase, relative to the express mode, the parameter comprising at least one of a ground-roll distance, a cruise altitude, a loiter duration, or a loiter altitude.

5. The flight control apparatus of claim 3, wherein the instructions, when executed by the at least one processor, further cause the flight control apparatus to:

based on the operation mode being set as the comfort mode, reduce, relative to the express mode, the parameter comprising at least one of an initial climb angle, an enroute climb angle, a cruise speed, or a descend angle.

6. The flight control apparatus of claim 1, wherein the parameter comprises at least one of:

a ground-roll distance, an initial climb angle, an enroute climb angle, a climb speed, a cruise altitude, a cruise speed, a descend angle, a loiter duration, or a loiter altitude.

7. The flight control apparatus of claim 1, further comprising:

an interface device configured to receive an origin of the aerial vehicle and the destination.

8. The flight control apparatus of claim 1, wherein the instructions, when executed by the at least one processor, further cause the flight control apparatus to:

determine, based on a user input, an origin of the aerial vehicle and the destination; and based on the origin and the destination, generate the at least one candidate path.

9. The flight control apparatus of claim 1, wherein the instructions, when executed by the at least one processor, further cause the flight control apparatus to:

determine whether the obstacle is safe by determining whether a distance from a one-engine operated path to the obstacle on ground is greater than or equal to a predetermined reference value.

10. The flight control apparatus of claim 1, wherein the instructions, when executed by the at least one processor, further cause the flight control apparatus to:

after determining that the obstacle is safe, determine whether it is possible for the aerial vehicle to fly to the destination based on:

an amount of charge in a battery of the aerial vehicle, and a remaining capacity of a fuel cell system of the aerial vehicle, and wherein the at least one power source comprises the battery and the fuel cell system.

11. The flight control apparatus of claim 1, wherein the instructions, when executed by the at least one processor, further cause the flight control apparatus to:

calculate, based on a determination that it is possible for the aerial vehicle to fly to the destination, an estimated time of arrival and a fare.

12. The flight control apparatus of claim 1, wherein the instructions, when executed by the at least one processor, further cause the flight control apparatus to:

cause the aerial vehicle to use an output voltage of a fuel cell system, of the aerial vehicle, during flight of the aerial vehicle; and based on a requested power output being greater than a maximum power output of the fuel cell system, cause the aerial vehicle to use an output voltage of a battery.

13. The flight control apparatus of claim 1, wherein the instructions, when executed by the at least one processor, further cause the flight control apparatus to:

based on at least one of ground-roll, climb, or loiter of the aerial vehicle being selected, cause the aerial vehicle to use an output voltage of a fuel cell system and an output voltage of a battery.

14. The flight control apparatus of claim 1, wherein the instructions, when executed by the at least one processor, further cause the flight control apparatus to:

based on the aerial vehicle descending or performing a ground roll for landing, cause the aerial vehicle to use an output voltage of a fuel cell system of the aerial vehicle.

15. A system comprising:

a battery configured to supply power to an aerial vehicle;

a fuel cell system configured to supply power to the aerial vehicle; and a flight control apparatus configured to:

determine, based on environmental information and based on variations of a parameter for each operation mode of the aerial vehicle, a flight path among at least one candidate path associated with a destination for the aerial vehicle;

determine whether an obstacle is safe in an ascending path of the determined flight path;

change, based on the determination of whether the obstacle is safe in the ascending path, the parameter for each operation mode of the aerial vehicle;

distribute, to the aerial vehicle, output voltages of the battery and the fuel cell system; and control, based on the determination of whether the obstacle is safe in the ascending path and based on the distributed output voltages, an operation of the aerial vehicle.

16. A flight control method performed by an aerial vehicle, the method comprising:

generating at least one candidate path associated with a destination for the aerial vehicle;

determining, based on environmental information and based on variations of a parameter for each operation mode, a flight path among the at least one candidate path;

determining whether an obstacle is safe in an ascending path of the determined flight path;

changing, based on the determining of whether the obstacle is safe in the ascending path, the parameter for each operation mode of the aerial vehicle;

controlling, based on the determination of whether the obstacle is safe in the ascending path, an output voltage of at least one power source of the aerial vehicle; and controlling, based on the controlled output voltage, a flight operation of the aerial vehicle.

17. The flight control method of claim 16, wherein the environmental information comprises at least one of:

cost information regarding costs incurred during a flight, noise information regarding noises generated during the flight, or obstacle information regarding obstacles encountered during the flight.

18. The flight control method of claim 16, wherein the operation mode comprises at least one of:

a comfort mode for user comfort, an express mode for improving movement speed, or an eco mode for cost reduction.

19. The flight control method of claim 16, wherein the parameter comprises at least one of:

a ground-roll distance, an initial climb angle, an enroute climb angle, a climb speed, a cruise altitude, a cruise speed, a descend angle, a loiter duration, or a loiter altitude.

*     *     *     *     *